(12) United States Patent
Uruma

(10) Patent No.: US 10,909,068 B2
(45) Date of Patent: Feb. 2, 2021

(54) DATA COMMUNICATION METHOD, STORAGE MEDIUM, DATA COMMUNICATION APPARATUS, AND INFORMATION PROCESSING APPARATUS THAT STORE TRANSMITTED DATA IN FOLDERS IN HIERARCHICAL STRUCTURE

(71) Applicant: CANON KABUSHIKI KAISHA, Tokyo (JP)

(72) Inventor: Kazuhiro Uruma, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 361 days.

(21) Appl. No.: 14/755,131

(22) Filed: Jun. 30, 2015

(65) Prior Publication Data
US 2016/0004722 A1    Jan. 7, 2016

(30) Foreign Application Priority Data

Jul. 1, 2014   (JP) ................. 2014-135852
Mar. 20, 2015  (JP) ................. 2015-057735

(51) Int. Cl.
*G06F 16/11*    (2019.01)

(52) U.S. Cl.
CPC .................. *G06F 16/113* (2019.01)

(58) Field of Classification Search
CPC ..................................... G06F 17/30
See application file for complete search history.

(56) References Cited

U.S. PATENT DOCUMENTS

| 7,679,761 B2* | 3/2010 | Kato ............... H04N 1/00204 358/1.15 |
| 7,881,334 B2* | 2/2011 | Yasuda ............. H04L 67/2823 370/465 |
| 8,508,780 B2* | 8/2013 | Mishima .......... H04N 1/00236 358/1.16 |

(Continued)

FOREIGN PATENT DOCUMENTS

| CN | 101165689 A | 4/2008 |
| CN | 102193926 A | 9/2011 |

(Continued)

OTHER PUBLICATIONS

Office Action issued in Chinese Application No. 201510378378.X dated Apr. 24, 2018. English translation provided.

(Continued)

*Primary Examiner* — Kim T Nguyen
(74) *Attorney, Agent, or Firm* — Rossi, Kimms & McDowell LLP

(57) ABSTRACT

A data communication method of storing data transmitted from a data transmission apparatus in a folder provided in an information processing apparatus and capable of checking content of backup data without opening the data by storing data. Folders are generated in each level of a hierarchical structure based on set hierarchical structure of the folders. Types of information related to transmission of the data are set as types of names of the folders in each level of the hierarchical structure. A specific value of the information related to the transmission of the data corresponding to the set types is provided to the generated folders as the names of the generated folders.

11 Claims, 18 Drawing Sheets

(56) References Cited

U.S. PATENT DOCUMENTS

| | | | | |
|---|---|---|---|---|
| 2002/0069212 A1* | 6/2002 | Leonardos | .......... | G06F 16/2228 |
| 2005/0063003 A1* | 3/2005 | Mishima | ............ | H04N 1/00241 |
| | | | | 358/1.15 |
| 2009/0132965 A1* | 5/2009 | Shimizu | ................ | G06F 3/0482 |
| | | | | 715/853 |
| 2014/0293361 A1* | 10/2014 | Mori | .................. | H04N 1/32379 |
| | | | | 358/403 |
| 2016/0253517 A1* | 9/2016 | Mori | ........................ | G09C 1/00 |
| | | | | 713/165 |

FOREIGN PATENT DOCUMENTS

| | | |
|---|---|---|
| CN | 103505178 A | 1/2014 |
| JP | H06348709 A | 12/1994 |
| JP | 2004007517 A | 1/2004 |
| JP | 2004356849 A | 12/2004 |
| JP | 2009205273 A | 9/2009 |

OTHER PUBLICATIONS

Office Action issued in Japanese Appln. No. 2015-057735 dated Nov. 27, 2018.

* cited by examiner

FIG. 4

<User Mode>

| Backup of Facsimile Transmission Document | OFF |
| Function A | OFF |
| Function B | OFF |
| Function C | OFF |

Close

FIG. 5

<Backup of Facsimile Transmission Document>
Setting of Data Storage Location

| Host Name | host_A |
| Data Storage Location | root |
| User Name | administrator |
| Password | * * * * * * |

Cancel　　　　Next

DATA COMMUNICATION METHOD, STORAGE MEDIUM, DATA COMMUNICATION APPARATUS, AND INFORMATION PROCESSING APPARATUS THAT STORE TRANSMITTED DATA IN FOLDERS IN HIERARCHICAL STRUCTURE

BACKGROUND OF THE INVENTION

Field of the Invention

The present invention relates to a data communication method, a storage medium, a data communication apparatus, and an information processing apparatus, and more particularly, to a data communication method, a storage medium, a data communication apparatus, and an information processing apparatus that store, in the information processing apparatus, data transmitted by facsimile.

Description of the Related Art

In a data communication apparatus that performs facsimile transmission, data transmitted by facsimile is backed up so that a user can check when and what kind of data is transmitted by facsimile at any time. Specifically, the data communication apparatus forwards the data transmitted by facsimile to a file server connected to a network at the end of the facsimile transmission to store the data in the file server.

For example, in Japanese Laid-Open Patent Publication (Kokai) No. 2004-356849, a data communication apparatus receives data from an information processing apparatus, such as an external PC, and at the end of facsimile transmission of the received data, the data communication apparatus stores the data in a folder provided in a file server based on additional information of the data transmitted by facsimile. A file name of the data and a folder name of the folder for storing the data are set based on the additional information of the data.

However, the folder is formed without a hierarchical configuration in the technique of Japanese Laid-Open Patent Publication (Kokai) No. 2004-356849. Therefore, when there are a plurality of data with similar file names for example, the hierarchical configuration of folders cannot be used to distinguish the data, and it may be difficult to specify desired data. As a result, the content of data transmitted by facsimile and backed up may not be easily checked when the data needs to be quickly checked without opening the data.

SUMMARY OF THE INVENTION

The present invention provides a data communication method, a storage medium, a data communication apparatus, and an information processing apparatus that can check content of backup data without opening the data.

Accordingly, the present invention provides a data communication method of storing data transmitted from a data transmission apparatus in a folder provided in an information processing apparatus, the data communication method comprising a hierarchical structure setting step of setting a hierarchical structure of folders, and a folder generation step of generating the folders in each level of the hierarchical structure based on the set hierarchical structure of the folders, wherein in the hierarchical structure setting step, types of information related to transmission of the data are set as types of names of the folders in each level of the hierarchical structure, and wherein in the folder generation step, a specific value of the information related to the transmission of the data corresponding to the set types is provided to the generated folders as the names of the generated folders.

According to the present invention, the folders are generated in each level of the hierarchical structure based on the set hierarchical structure of the folders, the types of the information related to the transmission of the data are set as the types of the names of the folders in each level of the hierarchical structure, and the specific values of the information related to the transmission of the data corresponding to the set types are provided to the generated folders as the names of the generated folders. As a result, specific information related to the transmission of data can be checked with reference to the names of the generated folders, and the content of backup data can be checked without opening the data.

Further features of the present invention will become apparent from the following description of exemplary embodiments (with reference to the attached drawings).

BRIEF DESCRIPTION OF THE DRAWINGS

FIG. 4 is a diagram used for describing a setting screen of a user mode used in the data communication process in FIG. 3.

FIG. 5 is a diagram used for describing a setting screen of backup of a facsimile transmission document used in the data communication process in FIG. 3.

DESCRIPTION OF THE EMBODIMENTS

An embodiment of the present invention will now be described in detail with reference to the drawings.

Figure 1:
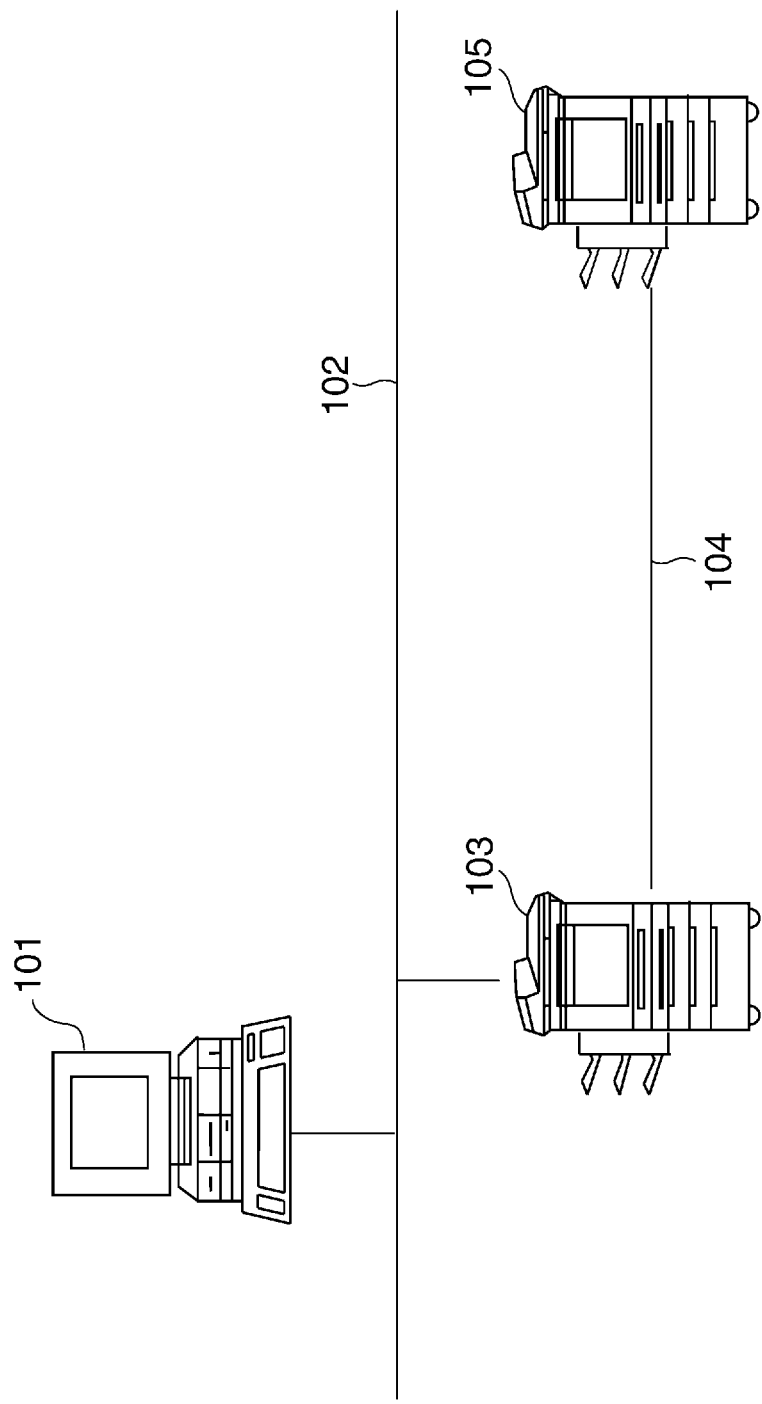
FIG. 1 is a block diagram schematically showing a configuration of a data communication system including an image communication apparatus as a data communication apparatus according to an embodiment of the present invention.

FIG. 1 is a block diagram schematically showing a configuration of a data communication system including an image communication apparatus 103 as a data communication apparatus according to an embodiment of the present invention.

In FIG. 1, the data communication system includes a file server 101 (information processing apparatus), the image communication apparatus 103 (data transmission apparatus), and a facsimile apparatus 105. The image communication apparatus 103 is connected to the file server 101 through a network 102 and connected to the facsimile apparatus 105 through a PSTN line 104. The image communication apparatus 103 with a facsimile function performs facsimile communication with the facsimile apparatus 105 through the PSTN line 104 and generates a transmission record recording a result, date, and the like of the facsimile transmission. The image communication apparatus 103 also performs data communication with the file server 101 through the network 102. The image communication apparatus 103 further backs up, for example, data transmitted to the facsimile apparatus 105 by facsimile communication by transmitting the data to the file server 101.

Figure 2:
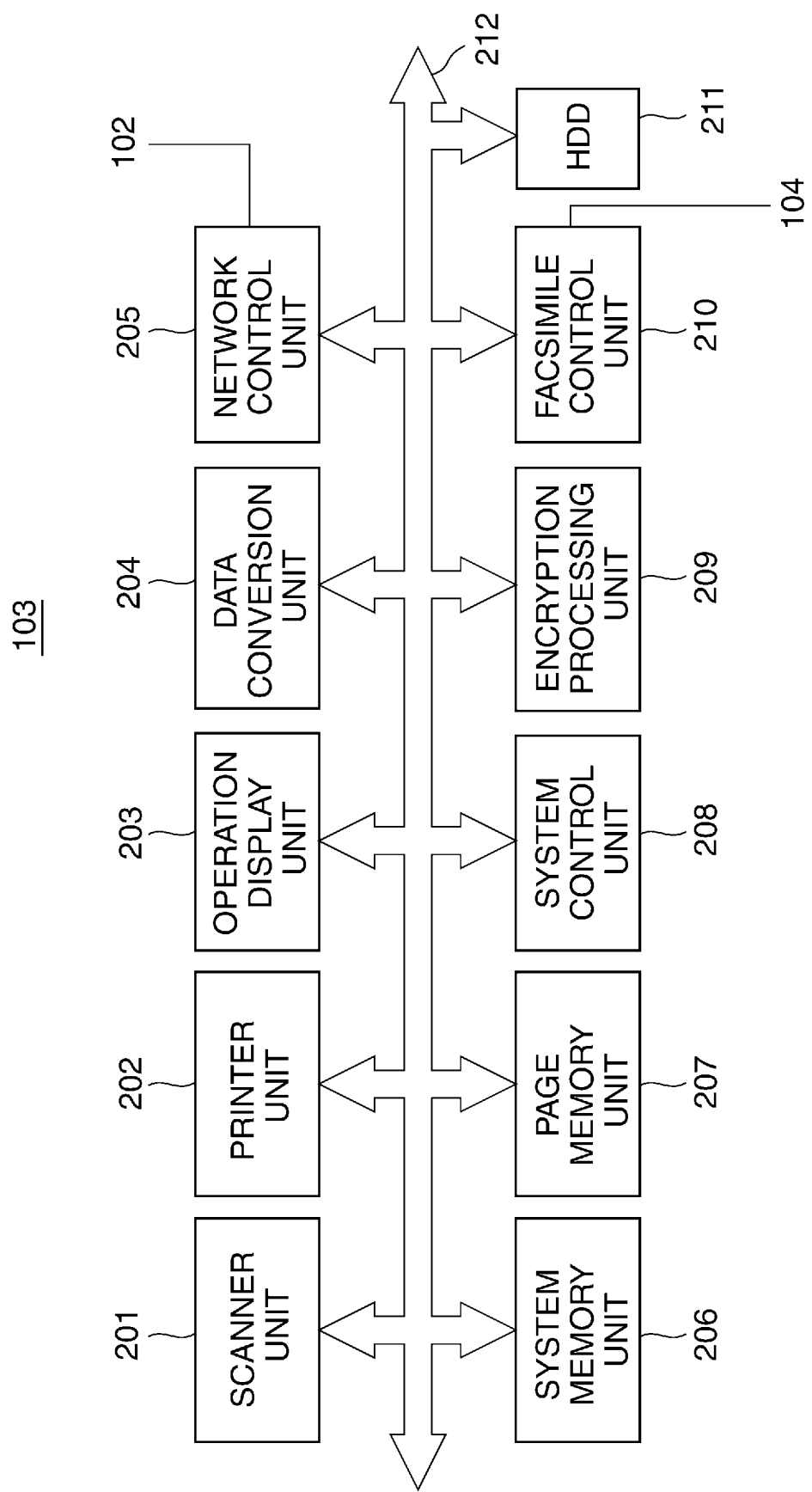
FIG. 2 is a block diagram schematically showing a configuration of the image communication apparatus in FIG. 1.

FIG. 2 is a block diagram schematically showing a configuration of the image communication apparatus 103 in FIG. 1.

The image communication apparatus 103 includes a scanner unit 201, a printer unit 202, an operation display unit 203, a data conversion unit 204, a network control unit 205, a system memory unit 206, a page memory unit 207, a system control unit 208, an encryption processing unit 209, a facsimile control unit 210, and an HDD 211. The constituent elements of the image communication apparatus 103 are connected to each other through a system bus 212.

The scanner unit 201 converts a manuscript or the like prepared by a user into digital data by optically reading the manuscript based on setting information set by the user, such as information regarding the paper size, the resolution, and the density. The printer unit 202 prints, for example, the digital data converted by the scanner unit 201. The operation display unit 203 includes a touch-panel display. The user can touch the display of the operation display unit 203 to select setting items displayed on the display to perform various settings.

The data conversion unit 204 converts data to perform facsimile communication of the data. Specifically, the data conversion unit 204 encodes data to be transmitted to the facsimile apparatus 105 and compresses the data. On the other hand, the data conversion unit 204 decodes encoded data received from the facsimile apparatus 105 to restore the data before encoding by the facsimile apparatus 105.

The network control unit 205 is connected to the network 102 and performs data communication with the file server 101 through the network. The network control unit 205 uses, for example, email, FTP (File Transfer Protocol), SMB (Server Message Block), and WebDAV (Distributed Authoring and Versioning protocol for the WWW) to perform data communication.

The system memory unit 206 includes an SRAM and a ROM. The SRAM in the system memory unit 206 stores information registered in advance in the image communication apparatus 103, such as information regarding a user mode described later. The ROM in the system memory unit 206 stores, for example, a control program used by the image communication apparatus 103. The page memory unit 207 stores data of one page when the data conversion unit 204 encodes and decodes data.

The system control unit 208 monitors operation of the constituent elements to comprehensively control the constituent elements. The encryption processing unit 209 encrypts data when the data is stored in the HDD 211 or when the data is transmitted to the file server 101. When the data is encrypted and stored in the HDD 211, the encryption processing unit 209 applies an encryption process to the encoded data and stores the encrypted data in the HDD 211. On the other hand, when the data is stored in the HDD 211 without encrypting the data, the encryption processing unit 209 stores the data encoded by the data conversion unit 204 in the HDD 211 without encrypting the data.

The facsimile control unit 210 is connected to a telephone line, such as the PSTN line 104, and performs facsimile communication with the facsimile apparatus 105 through the line. The HDD 211 is a non-volatile storage medium and stores, for example, data received by the network control unit 205, data scanned by the scanner unit 201, and a transmission record generated in the facsimile transmission.

Figure 3:
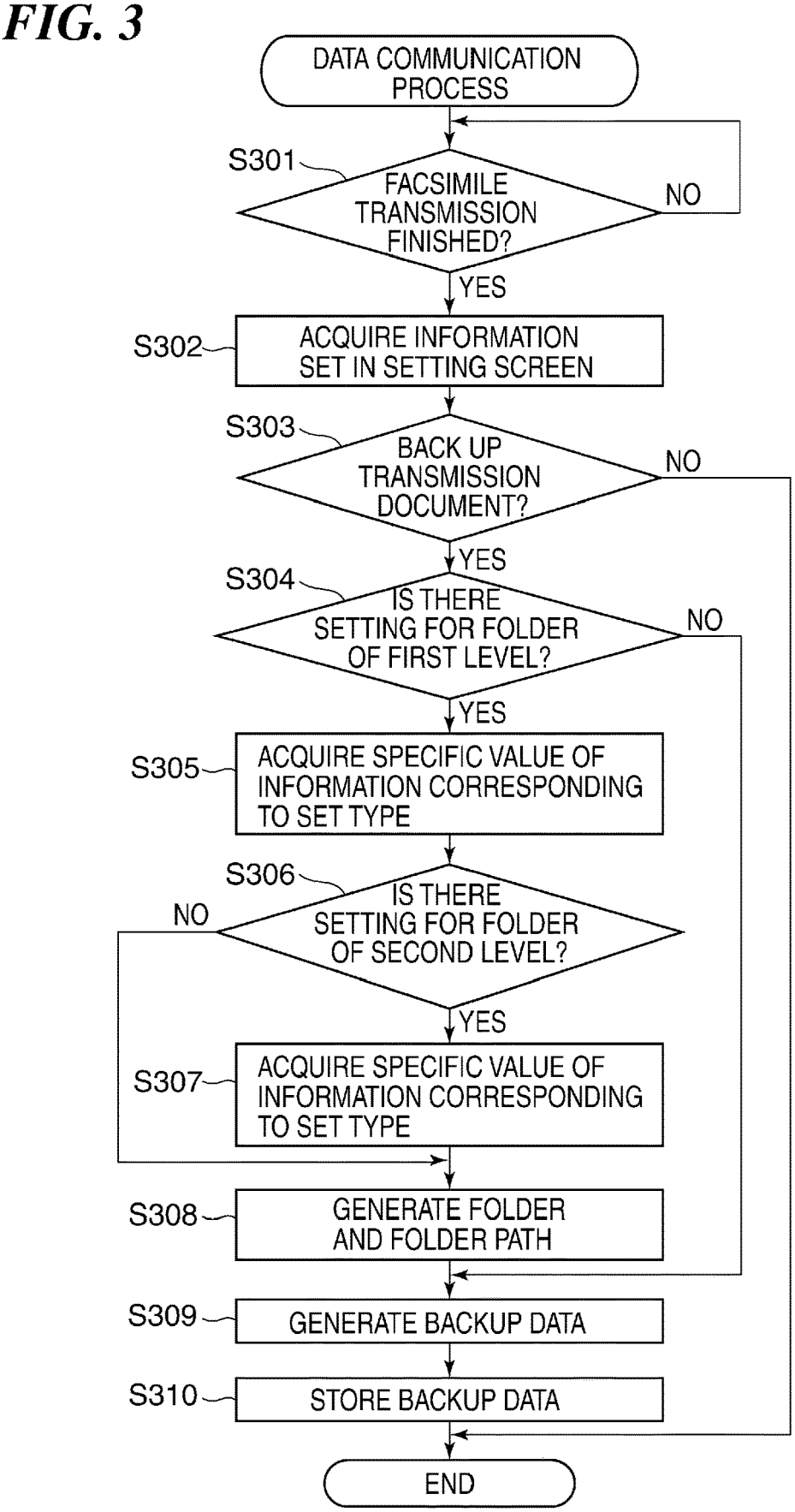
FIG. 3 is a flow chart showing a procedure of a data communication process executed by the image communication apparatus in FIG. 2.

FIG. 3 is a flow chart showing a procedure of a data communication process executed by the image communication apparatus 103 in FIG. 2.

The facsimile control unit 210 executes the process in FIG. 3 after the end of the facsimile transmission by the image communication apparatus 103.

If folders for storing data are formed without a hierarchical configuration in storing the data transmitted by facsimile in the file server 101 connected to the network, the hierarchical configuration of folders cannot be used to distinguish the data when, for example, there are a plurality of data with similar file names, and it may be difficult to specify desired data. As a result, the content of data transmitted by facsimile and backed up may not be easily checked when the data needs to be quickly checked without opening the data.

Accordingly, in the process in FIG. 3, the folder is provided with a name including a specific value of information related to facsimile transmission of data corresponding to a type that is set in a setting screen of backup of a facsimile transmission document in FIG. 6 described later.

Specifically, when the facsimile transmission is finished (step S301), the facsimile control unit 210 first acquires setting information that is set by using a setting screen 400 of user mode shown in FIG. 4. The facsimile control unit 210 further acquires information regarding the storage location of data and types of information related to the facsimile transmission of data that are set by using a setting screen 500 of backup of the facsimile transmission document shown in FIG. 5 and a setting screen 600 of backup of the facsimile transmission document shown in FIG. 6 (step S302) (hierarchical structure setting step).

In the setting screen 400 of user mode in FIG. 4, various settings, such as whether to back up the facsimile transmission document, are set. In the setting screen 500 of backup of the facsimile transmission document in FIG. 5, a host name of the file server 101 that stores the data, a storage location of the data, a login authentication user name of the file server 101, and a login authentication password are set, for example.

Figure 6:
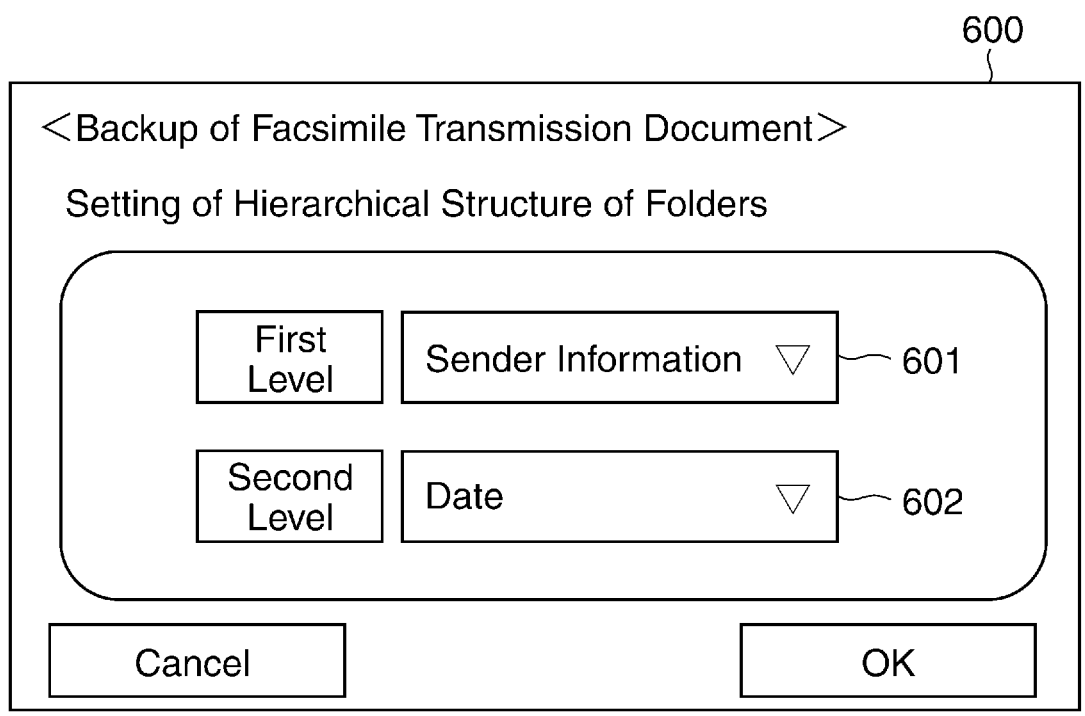
FIG. 6 is a diagram used for describing a setting screen of backup of the facsimile transmission document used in the data communication process in FIG. 3.

In the setting screen 600 of backup of the facsimile transmission document shown in FIG. 6, a hierarchical structure of folders is set. The hierarchical structure of folders is set by selecting, for each level of the folders, one of the types of information related to the facsimile transmission of data. In the present embodiment, a setting menu 601 of first level and a setting menu 602 of second level can be used for a first level and a second level to set the types of information related to the facsimile transmission of data as shown in FIG. 6, and a hierarchical structure of up to two levels of folders can be set.

The types of information related to the facsimile transmission of data include, for example, "sender information" indicating a name or the like of a sender of the facsimile transmission of the data, "date" of the facsimile transmission, "line information" indicating an abbreviation or the like of a line used in the facsimile transmission, "recipient information" indicating a name or the like of a recipient of the data transmitted by facsimile, "destination group information" indicating group information or the like corresponding to each of a plurality of destination tables including the recipient information, "billing code information" for specifying a billing destination of a cost required for the facsimile transmission, "confidential transmission information" corresponding to confidential transmission, and "F code information" used for the confidential transmission.

In the present embodiment, "no designation" can also be set in addition to the various types described above in the setting screen 600 of backup of the facsimile transmission document in FIG. 6. For example, when "no designation" is set for the first level, a hierarchical structure of folders without the first level is set.

The facsimile control unit 210 then determines whether to back up the facsimile transmission document based on the setting information acquired in step S302 (step S303).

When the facsimile transmission document is to be backed up as a result of the determination in step S303, the facsimile control unit 210 determines whether there is a setting regarding the folder of the first level based on the type of information related to the facsimile transmission of data acquired in step S302 (step S304).

Specifically, it is determined that there is a setting regarding the folder of the first level in step S304 when, for example, one of "sender information", "date", "line information", "recipient information", "destination group information", "billing code information", "confidential transmission information", and "F code information" is selected in the setting menu 601 of the first level in FIG. 6. On the other hand, it is determined that there is no setting regarding the folder of the first level in step S304 when, for example, "no designation" is selected in the setting menu 601 of the first level in FIG. 6.

If there is a setting of the folder of the first level as a result of the determination in step S304, the facsimile control unit 210 acquires a specific value corresponding to the type that is set in the setting menu 601 of the first level from a transmission record at the facsimile transmission stored in the HDD 211 (step S305).

In addition to a transmission result and a transmission date and time of the facsimile transmission, information regarding a recipient of the facsimile transmission, information regarding the sender of the facsimile transmission, group information corresponding to each of the plurality of destination tables, an abbreviation of the line used in the facsimile transmission, a billing code for specifying a billing destination of a cost required for the facsimile transmission, an F code used for confidential transmission are recorded in the transmission record, for example. If "sender information" is set in the setting menu 601 of the first level in the present embodiment, the specific value corresponding to the type that is set in the setting menu 601 of the first level is "User1".

The facsimile control unit 210 then determines whether there is a setting regarding the folder of the second level based on the type of information related to the facsimile transmission of data acquired in step S302 (step S306).

If there is a setting regarding the folder of the second level as a result of the determination in step S306, the facsimile control unit 210 acquires a specific value corresponding to the type that is set in the setting menu 602 of the second level from the transmission record at the facsimile transmission stored in the HDD 211 (step S307).

A folder for storing backup data is then generated, the folder having a name including the information regarding the data storage location, the specific value of the information related to the facsimile transmission of data corresponding to the type that is set in the setting menu 601 of the first level, and the specific value of the information related to the facsimile transmission of data corresponding to the type that is set in the setting menu 602 of the second level. A folder path corresponding to the data storage location is also generated (step S308) (folder generation step) (generation location setting step).

Figure 7:
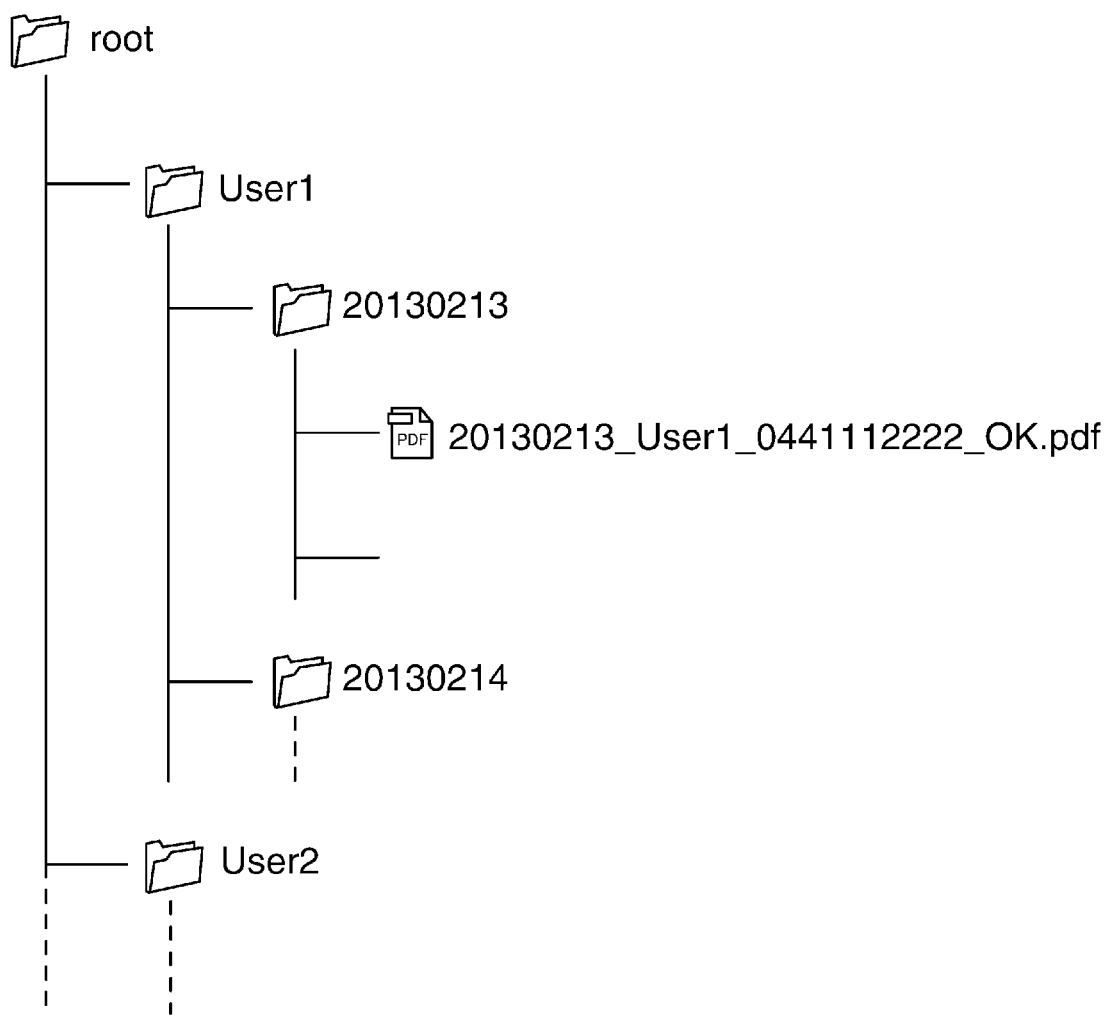
FIG. 7 is a diagram used for describing names of folders and names of backup data generated in the data communication process in FIG. 3.

As shown in FIG. 7, a folder with a name of the specific value (User1) corresponding to the type that is set in the setting menu 601 of the first level ("sender information" shown in the setting menu 601 in FIG. 6) is generated as a folder of the first level in a level below the data storage location ("root" shown in the setting menu 501 in FIG. 5). In the second level that is a level below the first level, a folder with a name of a specific value (20130213) corresponding to the type that is set in the setting menu 602 of the second level ("date" indicated in the setting menu 602 in FIG. 6) is generated as a folder of the second level.

In this case, "User1" and "20130213" are obtained as the information regarding the facsimile transmission of data stored in the folder of the second level, with reference to the name of the folder of the first level and the name of the folder of the second level. As a result, specific information related to the facsimile transmission of the data can be checked with reference to the names of the generated folders of the levels, and therefore, the content of the backup data (stored in the folder of the second level) can be checked without opening the data.

It should be noted that a folder path of the hierarchical structure shown in FIG. 7 is "/root/User1/20130213". If there is already a folder with the same name in the folder generation location in generating the folder in step S308, the already existing folder is used.

The facsimile control unit 210 then generates backup data with a file name determined based on the information indicating the transmission result, the information regarding the facsimile recipient, and the specific values corresponding to the types used in step S302 that are acquired from the transmission record at the facsimile transmission stored in the HDD 211 (step S309) (file name generation step).

Specifically, for example, "20130213" and "User1" are used as the specific values of "date" and "sender information" that are the types of information related to the facsimile transmission of data, and a FAX number "0441112222" of the recipient is used as the information regarding the facsimile recipient. If information "OK" indicating that the facsimile transmission is successfully executed is used as the information indicating the transmission result, backup data with a file name "20130213_User1_0441112222 OK" is generated as shown in FIG. 7.

More specifically, the file name of the backup data includes the specific values of the information related to the facsimile transmission of data provided as a name to the folder for storing the backup data, in addition to the information indicating the transmission result and the information regarding the facsimile recipient. As a result, the information related to the facsimile transmission of data can be surely checked with reference at least to the file names of the backup data.

It should be noted that although the backup data is pdf data in the present embodiment as shown in FIG. 7, the backup data may be data other than the pdf data, and for example, the backup data may be image data of the transmitted manuscript at the facsimile transmission or image data converted according to an image communication apparatus as a destination.

The facsimile control unit 210 then stores the backup data generated in step S309 in the folder for storing the backup data generated in step S308 (step S310) and ends the present process.

If there is no setting regarding the folder of the first level as a result of the determination in step S304, the facsimile control unit 210 does not construct the hierarchical structure of folders and executes the process in step S309 and subsequent steps to store the backup data in "root" that is the storage location set in the setting menu 501 in FIG. 5.

If there is no setting regarding the folder of the second level as a result of the determination in step S306, a folder for storing the backup data is generated, the folder having a name including only the information regarding the data storage location and the specific values of the information related to the facsimile transmission of data corresponding to the type that is set in the setting menu 601 of the first level. A folder path corresponding to the data storage location is then generated (step S308), and the process in step S309 and subsequent steps is executed.

If the facsimile transmission document is not to be backed up as a result of the determination in step S303, the present process immediately ends.

According to the process in FIG. 3, a folder for storing the backup data is generated, the folder having a name including the information regarding the data storage location, the specific value of the information related to the facsimile transmission of data corresponding to the type that is set in the setting menu 601 of the first level, and the specific value of the information related to the facsimile transmission of the data corresponding to the type that is set in the setting menu 602 of the second level. As a result, specific information related to the facsimile transmission of data can be checked with reference to the names of the folders generated in the levels, and therefore, the content of the backup data can be checked without opening the data.

Since the folders are generated at the set generation location in the process in FIG. 3, the user can create folders at a desired location, allowing the user to easily manage the folders.

The backup data with the file name including the specific values of the information related to the facsimile transmission of data is generated in the process in FIG. 3, and the information related to the facsimile transmission of data can be surely checked with reference at least to the file names of the backup data.

In the process in FIG. 3, the file name of the backup data includes the specific values (for example, "20130213" and "User1") of the information related to the facsimile transmission of data provided as a name to the folder for storing the backup data. As a result, the folders of the storage location can be specified with reference to the file names of the backup data, and therefore, the backup data can be easily managed.

Figure 8:
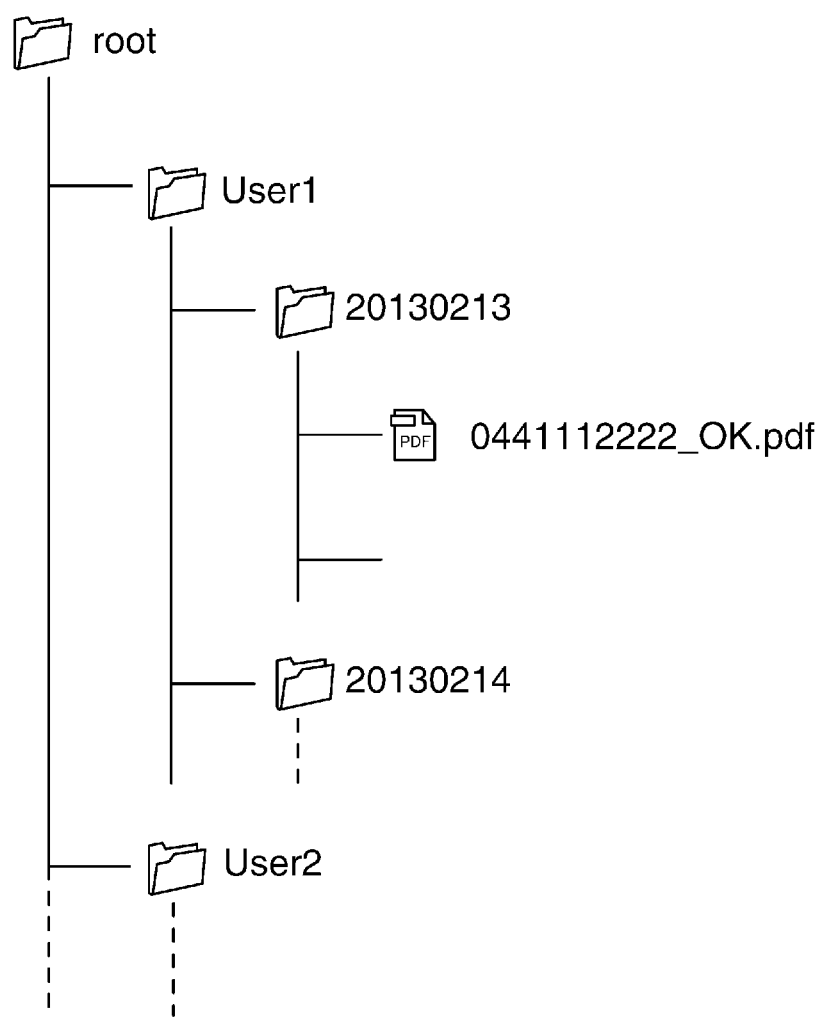
FIG. 8 is a diagram used for describing names of folders and names of backup data generated in a modified example of the data communication process in FIG. 3.

The file name of the backup data generated in step S309 may be determined according to a prescribed naming rule of file name in the present embodiment, and for example, the file name may be determined by excluding the specific values of the information related to the data transmission provided to the folder name of the first level and the folder name of the second level as shown in FIG. 8. This can simplify the file name of the backup data.

Meanwhile, the name of the folder storing the backup data includes the information related to the facsimile transmission of data, and the information related to the facsimile transmission of data can be checked with reference to the file names of the backup data in addition to the names of the folders. As a result, while the file name of the backup data is simplified, the information related to the facsimile transmission of data can be checked to check the content of the backup data without opening the data.

In the present embodiment, the information of the facsimile recipient may be selected as a type of the information related to the facsimile transmission of data, for example. As a result, the types of information related to the facsimile transmission of data include the sender of the data, the recipient of the data, and the date and time of the facsimile transmission. Therefore, the name of the folder and the file name of the backup data can be referenced to check "who, whom, and when" the data is transmitted, without opening the file. In this case, simultaneous transmission in which the facsimile transmission is performed for a plurality of persons at the same time or single transmission in which the facsimile transmission is performed for a single recipient may be able to be selected for the information of the facsimile recipient.

Although the hierarchical structure of up to two levels of folders can be set in the present embodiment, the setting menus of the levels in the setting screen 600 of backup may be increased to allow setting a hierarchical structure of three or more levels of folders.

When "date" is set as the type of information related to the facsimile transmission of data in the present embodiment, the specific value of information is not limited to "year, month, and day". The specific value may be "year", "year and month", "year, month, and day", "year, month, day, and hour", or "year, month, day, hour, and minute".

In the present embodiment, information not used for the folder name in the transmission record at the facsimile transmission stored in the HDD 211 may be used for the file name of the backup data. For example, when only "year, month, and day" is used for the folder name with respect to the information "year, month, day, hour, and minute", information indicating "hour and minute" may be used for the file name of the backup data.

The storage location of the backup data is not limited to the file server 101 in the present embodiment, and for example, the storage location may be another server on the network, a storage, or the image communication apparatus 103.

Figure 9:
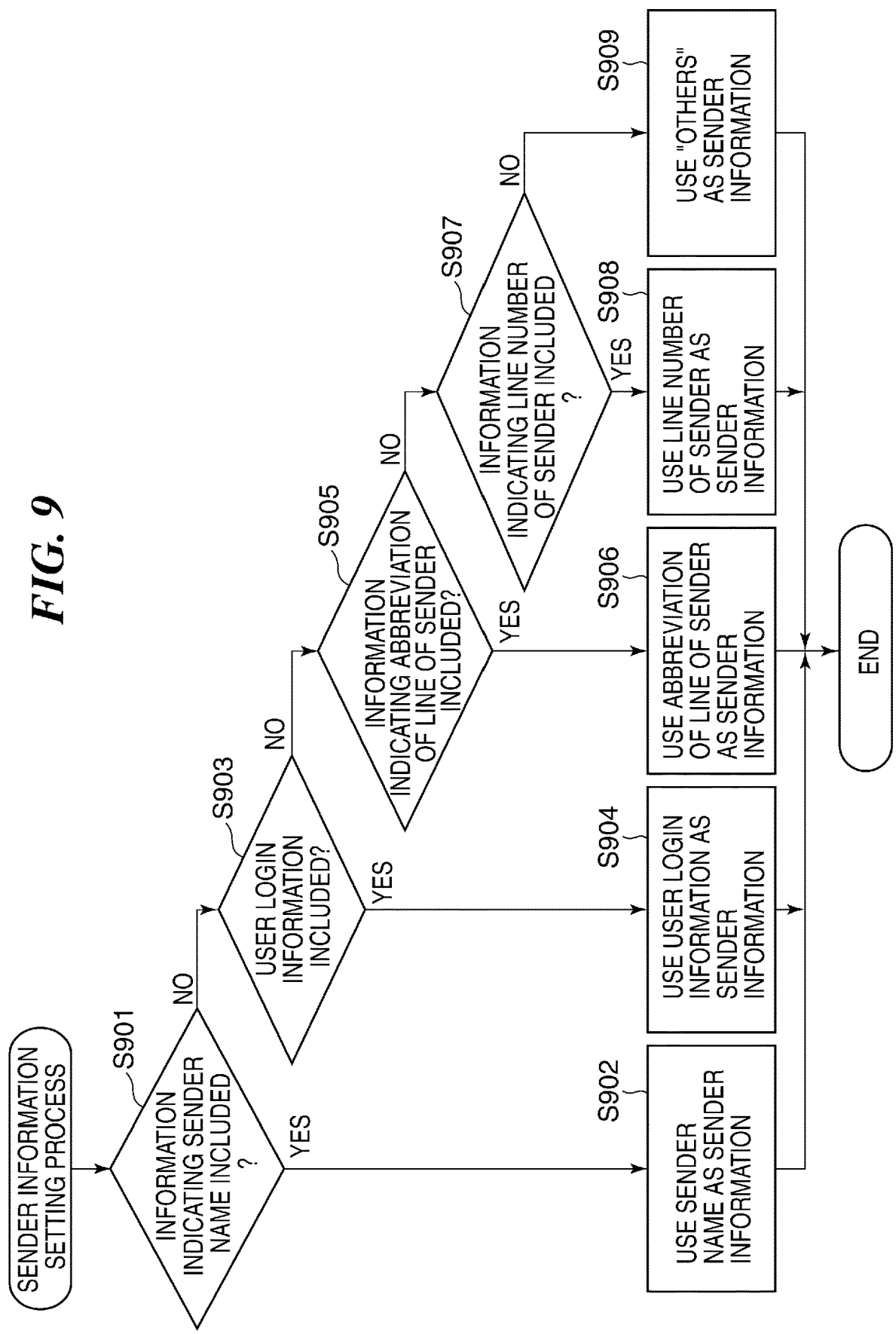
FIG. 9 is a flow chart showing a procedure of a modified example of a setting process of sender information in the data communication process in FIG. 3.

In the present embodiment, the sender information may be set based on predetermined priorities as shown in FIG. 9.

FIG. 9 is a flow chart showing a procedure of a modified example of the setting process of the sender information in the data communication process in FIG. 3.

The system control unit 208 executes the process in FIG. 9 after the end of the facsimile transmission by the image communication apparatus 103.

In the present embodiment, the sender information includes a plurality of types of information as described later, such as information indicating "sender name", "user login information", information indicating "abbreviation of facsimile line corresponding to sender" and information indicating "line number of facsimile line corresponding to sender". Therefore, if all of the information included in the sender information is used for the folder name for storing the backup data or the file name of the backup data, the folder name or the file name becomes redundant, and as a result, it may be difficult to check the specific information related to the facsimile transmission of data from the folder name or the file name. On the other hand, if the information used for the folder name for storing the backup data or the file name of the backup data is limited only to specific information of the plurality of types of information included in the sender information, it may be difficult to specify the sender from the folder name or the file name of the backup data.

Accordingly, in the process in FIG. 9, the information to be used as the sender information in the folder name or the file name is selected from the plurality of types of information included in the sender information based on the predetermined priorities when the sender information is set as the type of the folder name or the file name of the backup data.

Specifically, the system control unit 208 first determines whether the transmission record at the facsimile transmission stored in the HDD 211 includes information indicating the sender name (step S901). The sender name is, for example, information in which the department of the user and the personal name of the user are compiled, and is information recorded in the transmission record according to the facsimile transmission by the user when the sender name is set in the setting screen 400 of the user mode in FIG. 4.

If the transmission record at the facsimile transmission includes the information indicating the sender name as a result of the determination in step S901, the system control unit 208 uses the information indicating the sender name, such as information of one of the department of the user and the personal name of the user, as the sender information (step S902) and ends the present process.

If the transmission record at the facsimile transmission does not include the information indicating the sender name as a result of the determination in step S901, the system control unit 208 determines whether the transmission record at the facsimile transmission includes user login information (step S903).

If the transmission record at the facsimile transmission includes the user login information as a result of the determination in step S903, the system control unit 208 uses the user login information as the sender information (step S904) and ends the present process.

If the transmission record at the facsimile transmission does not include the user login information as a result of the determination in step S903, the system control unit 208 determines whether information indicating the abbreviation of the facsimile line corresponding to the sender is stored in the system memory unit 206 (step S905).

If the information indicating the abbreviation of the facsimile line corresponding to the sender is stored in the system memory unit 206 as a result of the determination in step S905, the system control unit 208 uses the information indicating the abbreviation of the facsimile line corresponding to the sender as the sender information (step S906) and ends the present process.

If the information indicating the abbreviation of the facsimile line corresponding to the sender is not stored in the system memory unit 206 as a result of the determination in step S905, the system control unit 208 determines whether information indicating the line number of the facsimile line corresponding to the sender is stored in the system memory unit 260 (step S907).

If the information indicating the line number of the facsimile line corresponding to the sender is stored in the system memory unit 206 as a result of the determination in step S907, the system control unit 208 uses the information indicating the line number of the facsimile line corresponding to the sender as the sender information (step S908) and ends the present process.

If the information indicating the line number of the facsimile line corresponding to the sender is not stored in the system memory unit 206 as a result of the determination in step S907, the system control unit 208 uses, as the sender information, "others" indicating that there is no sender information (step S909) and ends the present process.

According to the process in FIG. 9, the information to be used for the folder name or the file name in the sender information is selected from the plurality of types of information included in the sender information based on the predetermined priorities, and this can prevent the folder name for storing the backup data or the file name of the backup data from becoming unnecessarily redundant even if the target of the sender information includes a plurality of types of information.

As a result, specific information related to the facsimile transmission of data can be easily checked from the folder name and the file name. Furthermore, the information used for the folder name or the file name does not have to be limited only to specific information among the plurality of types of information included in the sender information, and this can prevent the difficulty in specifying the sender from the folder name or the file name of the backup data.

In the present embodiment, line information may be set based on an abbreviation of a line used for the facsimile communication when the image communication apparatus 103 can use multiple lines to perform the facsimile communication.

Figure 10:
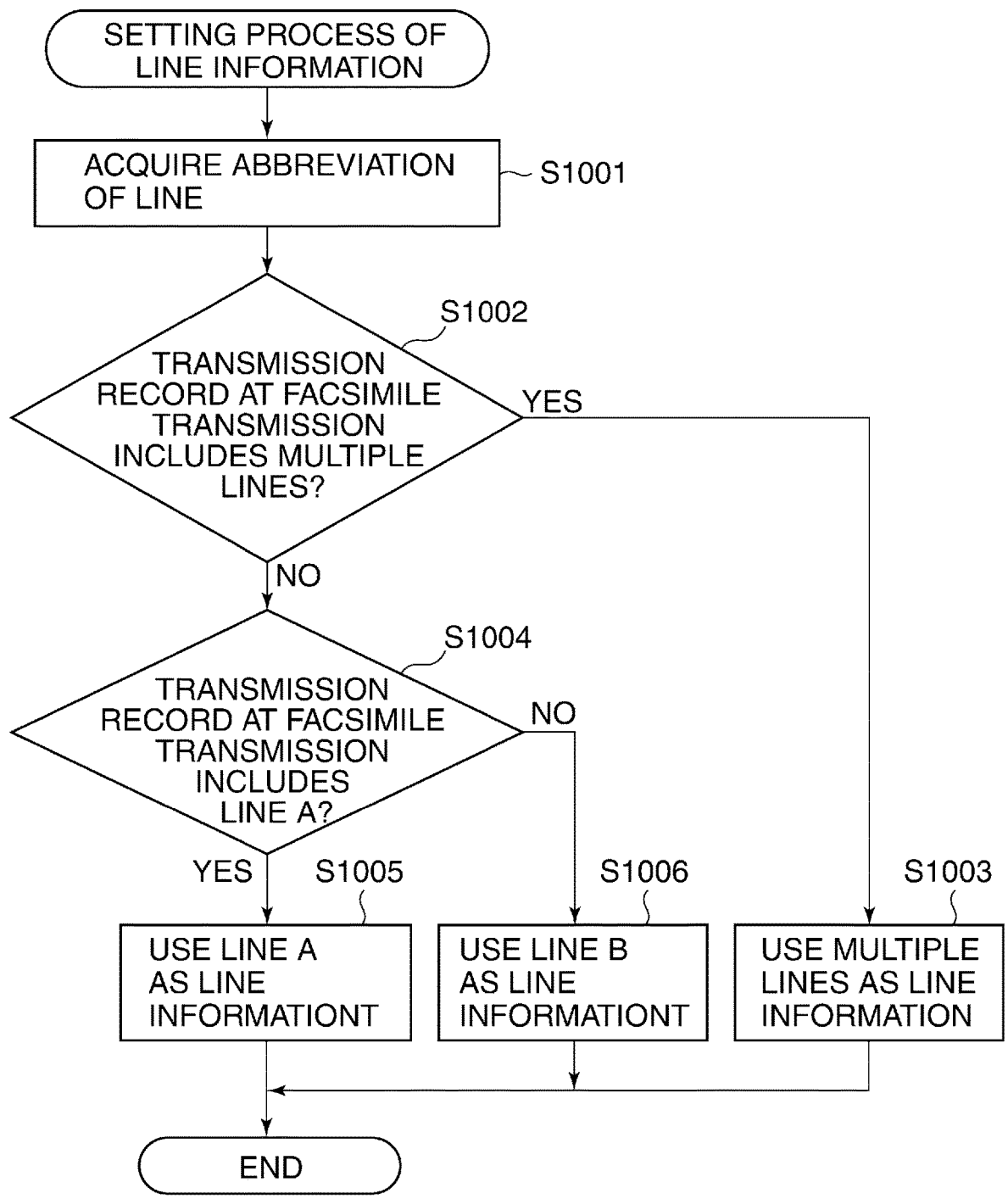
FIG. 10 is a flow chart showing a procedure of a setting process of line information executed by the image communication apparatus in FIG. 2.

FIG. 10 is a flow chart showing a procedure of the setting process of the line information executed by the image communication apparatus 103 in FIG. 2.

The system control unit 208 executes the process in FIG. 10 after the end of the facsimile transmission by the image communication apparatus 103.

In FIG. 10, the system control unit 208 first acquires an abbreviation of a line if the transmission record at the facsimile transmission stored in the HDD 211 includes the abbreviation of the line (step S1001). The image communication apparatus 103 can use multiple lines to perform facsimile communication, and an example of using two lines to perform the facsimile communication will be described in the present embodiment.

The transmission record at the facsimile transmission includes abbreviations of the lines used in the facsimile communication, and specifically, the transmission record includes one of "line A", "line B", and "multiple lines", "line A" and "line B" each indicating an abbreviation of each of two lines, "multiple lines" indicating an abbreviation of lines when both of the line A and the line B are used. Examples of the case in which the transmission record at the facsimile transmission includes multiple lines include a case of simultaneous transmission in which the image communication apparatus 103 simultaneously performs facsimile transmission for a plurality of apparatuses including the facsimile apparatus 105 and a case in which the facsimile transmission using the line A has failed and then the line B different from the line A is used to perform the facsimile transmission for the same sender.

The system control unit 208 then determines whether the transmission record at the facsimile transmission includes multiple lines (step S1002).

If the transmission record at the facsimile transmission includes multiple lines as a result of the determination in step S1002, the system control unit 208 uses the multiple lines as the line information (step S1003) and ends the present process.

If the transmission record at the facsimile transmission does not include multiple lines as a result of the determination in step S1002, that is, if the transmission record at the facsimile transmission includes one of the line A and the line B, the system control unit 208 determines whether the transmission record at the facsimile transmission includes "line A" (step S1004).

If the transmission record at the facsimile transmission includes the line A as a result of the determination in step S1004, the system control unit 208 uses the line A as the line information (step S1005) and ends the present process.

Figure 11:
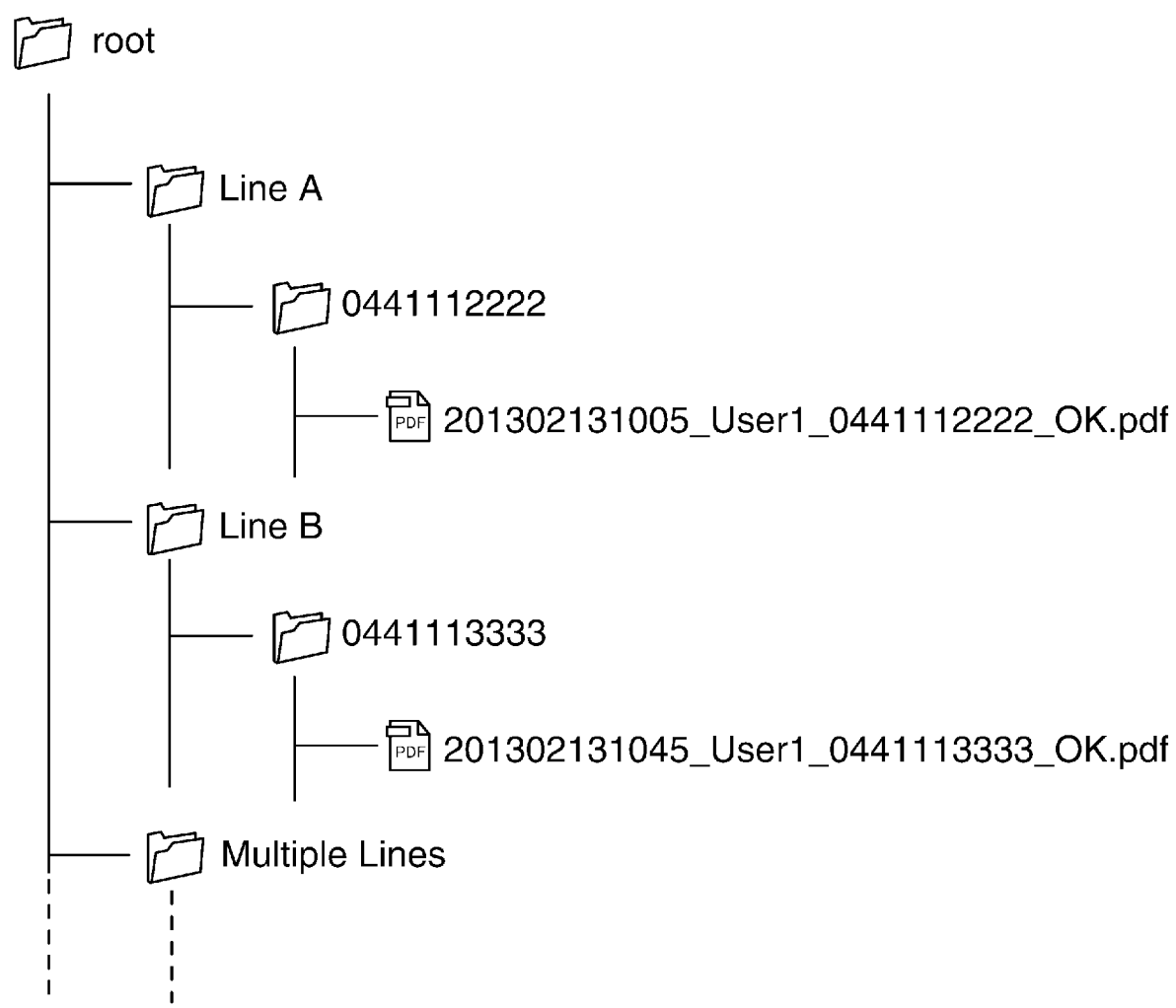
FIG. 11 is a diagram used for describing names of folders generated based on the line information set by a system control unit in FIG. 2.

If the transmission record at the facsimile transmission does not include the line A as a result of the determination in step S1004, that is, if the transmission record at the facsimile transmission includes the line B, the system control unit 208 uses the line B as the line information (step S1006). As a result, for example, when line information is set in the setting menu 601 of the first level in the image communication apparatus 103 that can use multiple lines to perform the facsimile transmission, folders with names corresponding to the set line information are generated in the first level that is a level below "root" as shown in FIG. 11. The system control unit 208 then ends the present process after executing the process in step S1006.

The same advantage as in the process in FIG. 3 can also be attained in the process in FIG. 10.

Figure 12:
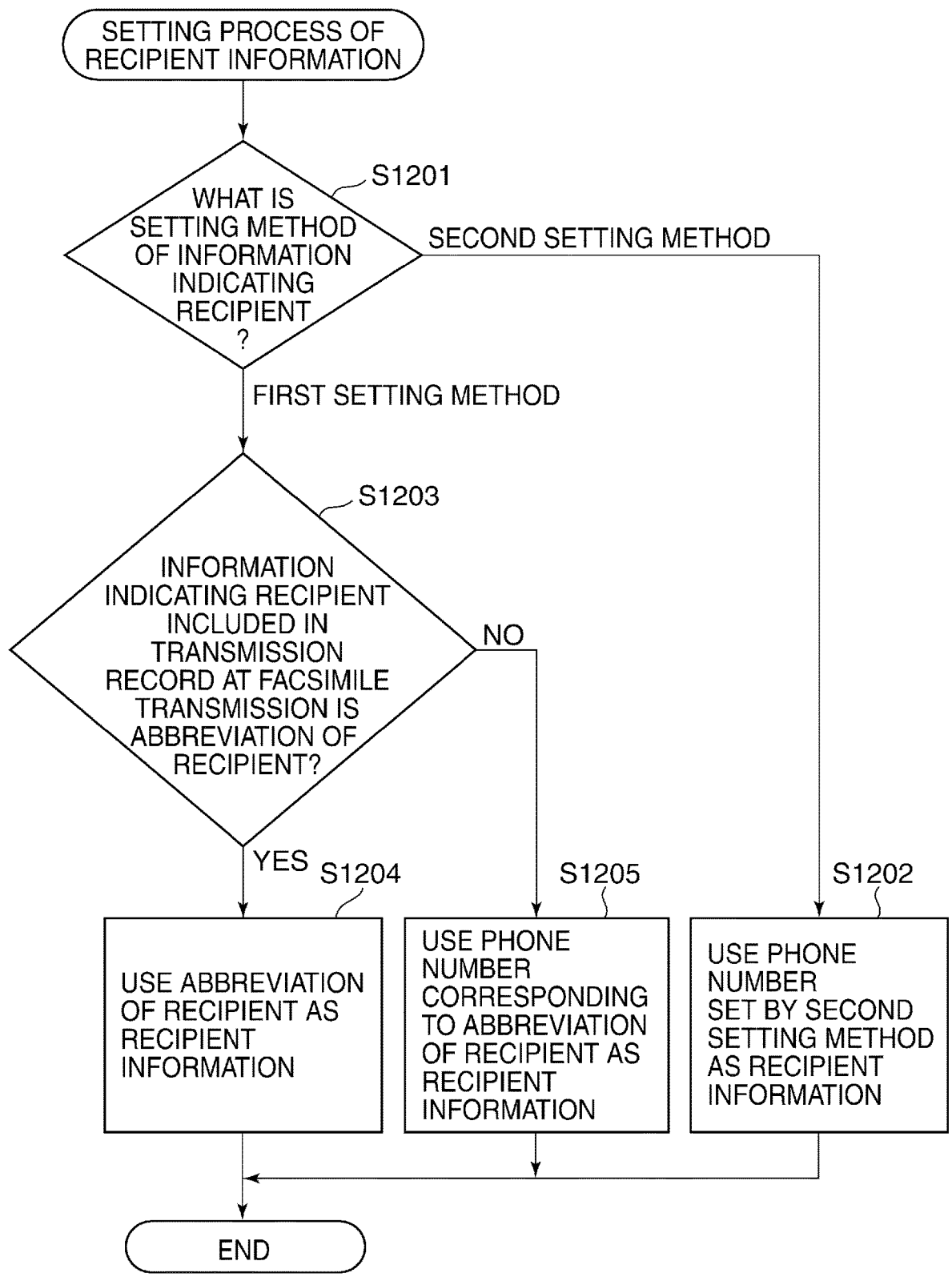
FIG. 12 is a flow chart showing a procedure of a setting process of recipient information executed by the image communication apparatus in FIG. 2.

In the present embodiment, the recipient information may be set based on a destination table stored in advance in the HDD 211 or the like as shown in FIG. 12 described later.

FIG. 12 is a flow chart showing a procedure of the setting process of the recipient information executed by the image communication apparatus 103 in FIG. 2.

The system control unit 208 executes the process in FIG. 12 after the end of the facsimile transmission by the image communication apparatus 103.

In FIG. 12, if the transmission record at the facsimile transmission stored in the HDD 211 includes information indicating the recipient including an abbreviation of the recipient of the facsimile communication or a phone number corresponding to the abbreviation of the recipient, the system control unit 208 checks a setting method of the information indicating the recipient (hereinafter, called "recipient setting method") (step S1201).

In the present embodiment, a destination table for selecting the recipient of the facsimile communication is stored in advance in the HDD 211 or the like, and the destination table includes abbreviations of a plurality of recipient candidates and phone numbers corresponding to the abbreviations. The recipient setting methods include a first setting method of setting the recipient by selecting a predetermined abbreviation or phone number from the destination table and a second setting method in which the user operates the operation display unit 203 to directly set the phone number of the recipient of the facsimile transmission without using the destination table, and the transmission record also includes information indicating which one of the first setting method and the second setting method is used.

If the information indicating the recipient is set by the second setting method in step S1201, the system control unit 208 uses the phone number set by the second setting method as the recipient information (step S1202) and ends the present process.

If the information indicating the recipient is set by the first setting method in step S1201, the system control unit 208 determines whether the information indicating the recipient included in the transmission record at the facsimile transmission stored in the HDD 211 is the abbreviation of the recipient (step S1203).

If the information indicating the recipient included in the transmission record at the facsimile transmission is the abbreviation of the recipient as a result of the determination in step S1203, the system control unit 208 uses the abbreviation of the recipient as the recipient information (step S1204) and ends the present process.

If the information indicating the recipient included in the transmission record at the facsimile transmission is not the abbreviation of the recipient as a result of the determination in step S1203, that is, if the information indicating the recipient included in the transmission record at the facsimile transmission is the phone number corresponding to the abbreviation of the recipient, the system control unit 208 uses the phone number as the recipient information (step S1205) and ends the present process.

The same advantage as in the process in FIG. 3 can also be attained in the process in FIG. 12.

Figure 13:
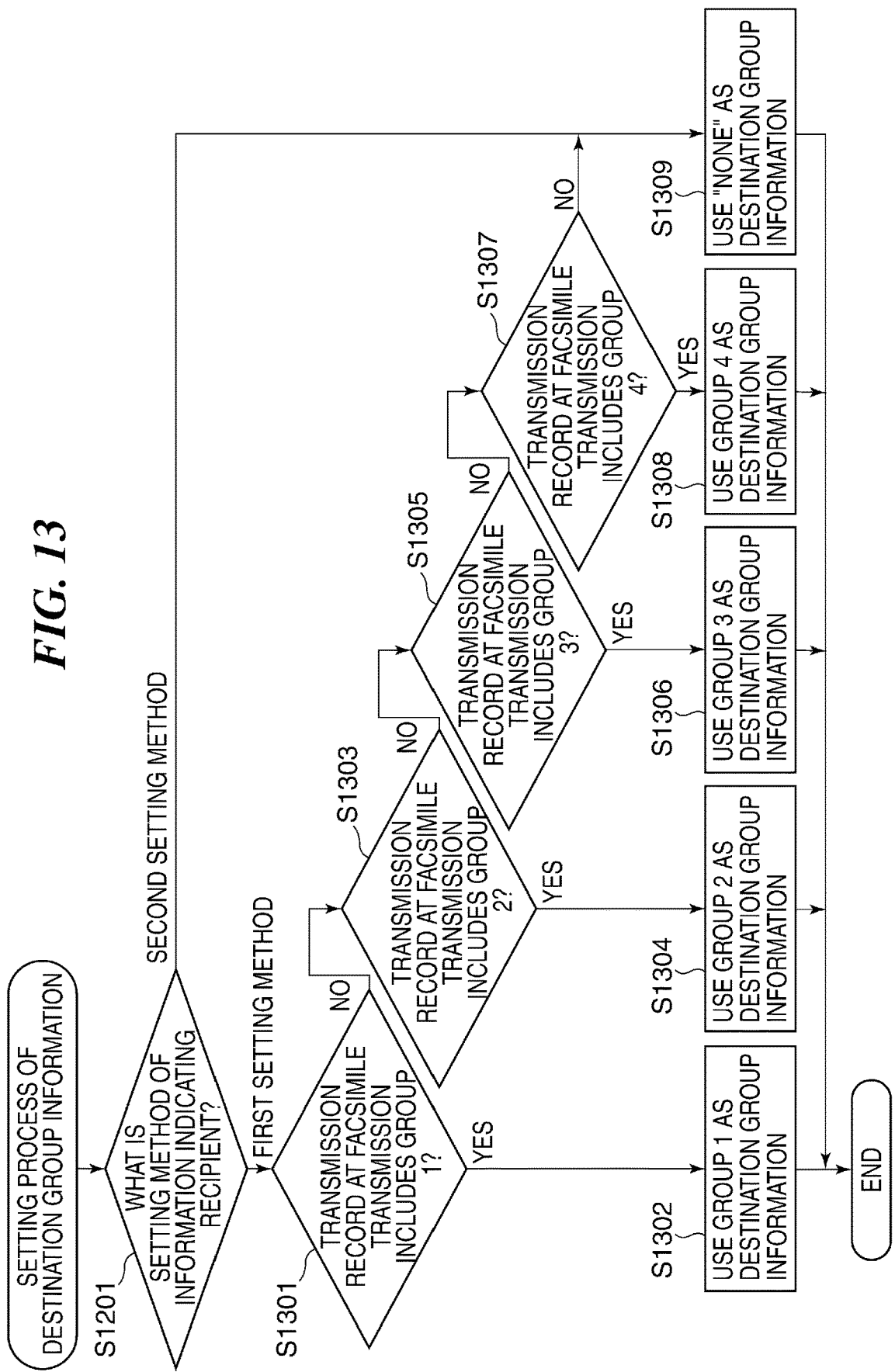
FIG. 13 is a flow chart showing a procedure of a setting process of destination group information executed by the image communication apparatus in FIG. 2.

In the present embodiment, destination group information may also be set based on group information that is set in each destination table as shown in FIG. 13.

FIG. 13 is a flow chart showing a procedure of the setting process of the destination group information executed by the image communication apparatus 103 in FIG. 2.

The system control unit 208 executes the process in FIG. 13 after the end of the facsimile transmission by the image communication apparatus 103.

In FIG. 13, the system control unit 208 first executes the same process as in step S1201 in FIG. 12. In the present embodiment, the group information is set in each of a plurality of destination tables stored in the HDD 211, and the group information is set so that at least one destination table corresponds to one group.

If the abbreviation of the recipient or the phone number of the recipient is set by the first setting method, the transmission record at the facsimile transmission stored in the HDD 211 also includes the group information corresponding to the destination table used in the first setting method. An example in which the group information of one of groups 1 to 4 is set in each destination table will be described.

If the information indicating the recipient is set by the first setting method in step S1201, the system control unit 208 determines whether the transmission record at the facsimile transmission includes the group 1 (step S1301).

If the transmission record at the facsimile transmission includes the group 1 as a result of the determination in step S1301, the system control unit 208 uses the group 1 as the destination group information (step S1302) and ends the present process.

If the transmission record at the facsimile transmission does not include the group 1 as a result of the determination in step S1301, the system control unit 208 determines whether the transmission record at the facsimile transmission includes the group 2 (step S1303).

If the transmission record at the facsimile transmission includes the group 2 as a result of the determination in step S1303, the system control unit 208 uses the group 2 as the destination group information (step S1304) and ends the present process.

If the transmission record at the facsimile transmission does not include the group 2 as a result of the determination in step S1303, the system control unit 208 determines whether the transmission record at the facsimile transmission includes the group 3 (step S1305).

If the transmission record at the facsimile transmission includes the group 3 as a result of the determination in step S1305, the system control unit 208 uses the group 3 as the destination group information (step S1306) and ends the present process.

If the transmission record at the facsimile transmission does not include the group 3 as a result of the determination in step S1305, the system control unit 208 determines whether the transmission record at the facsimile transmission includes the group 4 (step S1307).

If the transmission record at the facsimile transmission includes the group 4 as a result of the determination in step S1307, the system control unit 208 uses the group 4 as the destination group information (step S1308) and ends the present process.

If the information indicating the recipient is set by the second setting method in step S1201, or if the transmission record at the facsimile transmission does not include the group 4 as a result of the determination in step S1307, the system control unit 208 determines that there is no destination group information and uses "none" as the destination group information (step S1309).

Figure 14:
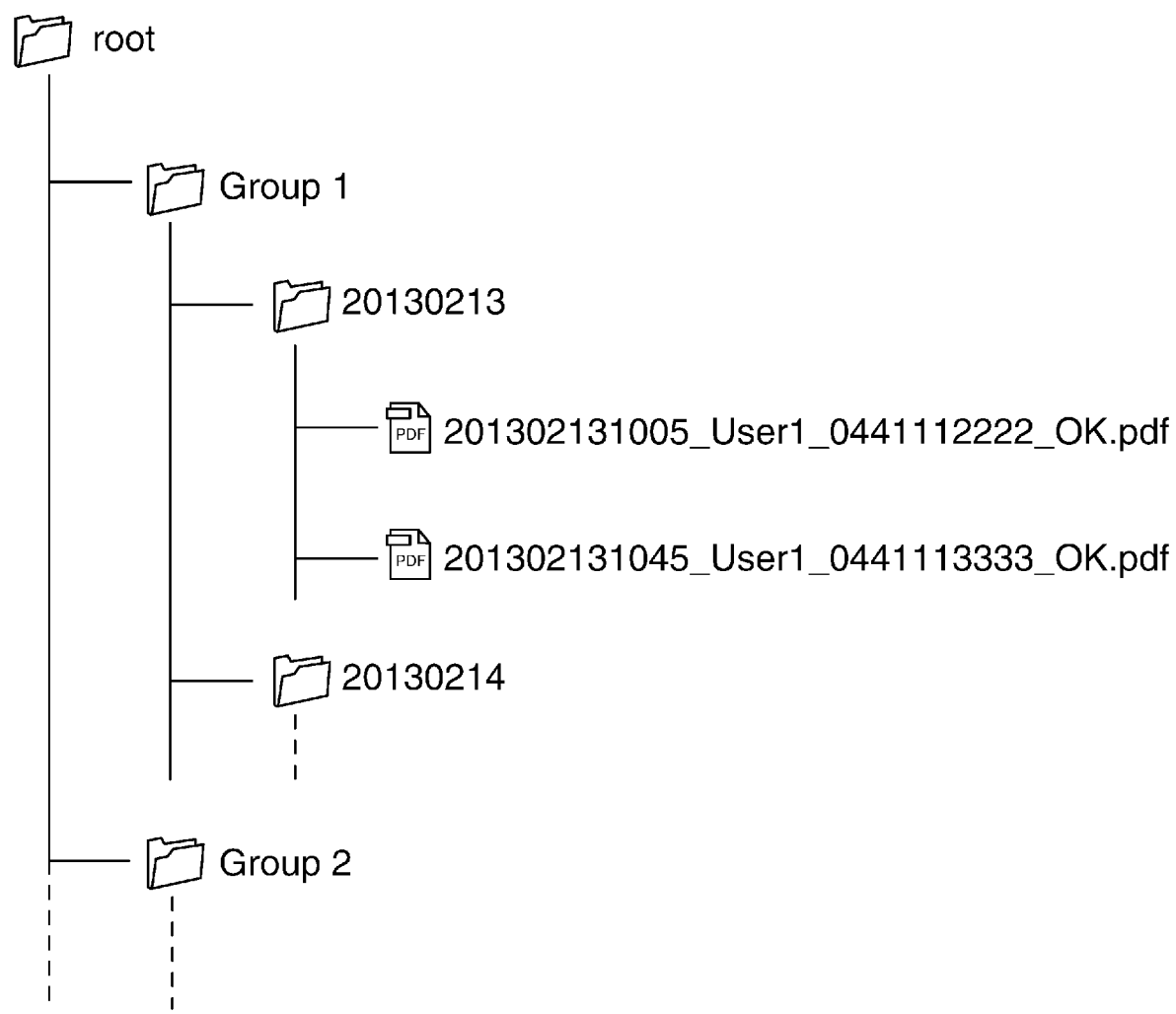
FIG. 14 is a diagram used for describing names of folders generated based on the destination group information set by the system control unit in FIG. 2.

As a result, when the destination group information is set in the setting menu 601 of the first level for example, folders with names corresponding to the set destination group information are generated in the first level that is a level below "root" as shown in FIG. 14. The system control unit 208 then ends the present process after executing the process in step S1309.

The same advantage as in the process in FIG. 3 can also be attained in the process in FIG. 13.

Figure 15:
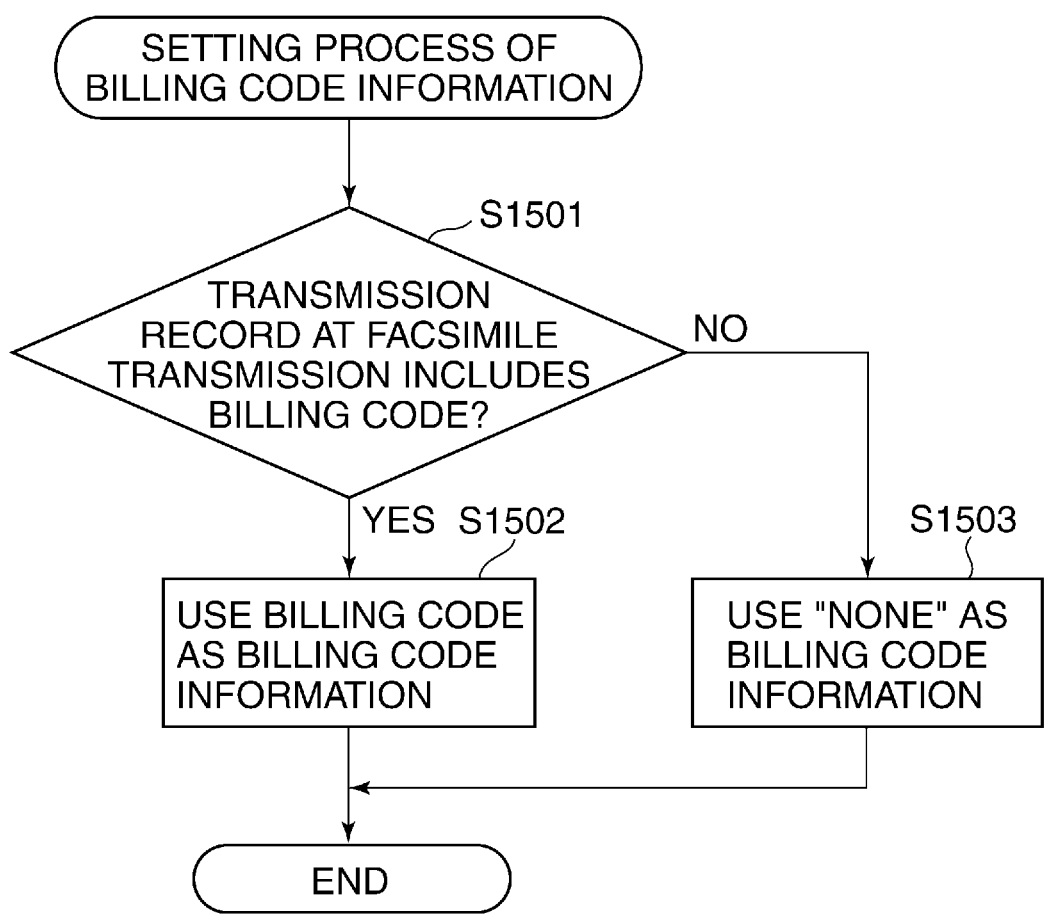
FIG. 15 is a flow chart showing a procedure of a setting process of billing code information executed by the image communication apparatus in FIG. 2.

In the present embodiment, billing code information may be set based on a billing code for specifying a billing destination of a cost required for the facsimile transmission as shown in FIG. 15.

FIG. 15 is a flow chart showing a procedure of the setting process of the billing code information executed by the image communication apparatus 103 in FIG. 2.

The system control unit 208 executes the process in FIG. 15 after the end of the facsimile transmission by the image communication apparatus 103.

In FIG. 15, the system control unit 208 first determines whether the transmission record at the facsimile transmission stored in the HDD 211 includes a billing code (step S1501).

If the transmission record at the facsimile transmission includes a billing code, such as "XXXX" and "YYYY", as a result of the determination in step S1501, the system control unit 208 acquires the billing code to use the acquired billing code as the billing code information (step S1502) and ends the present process.

Figure 16:
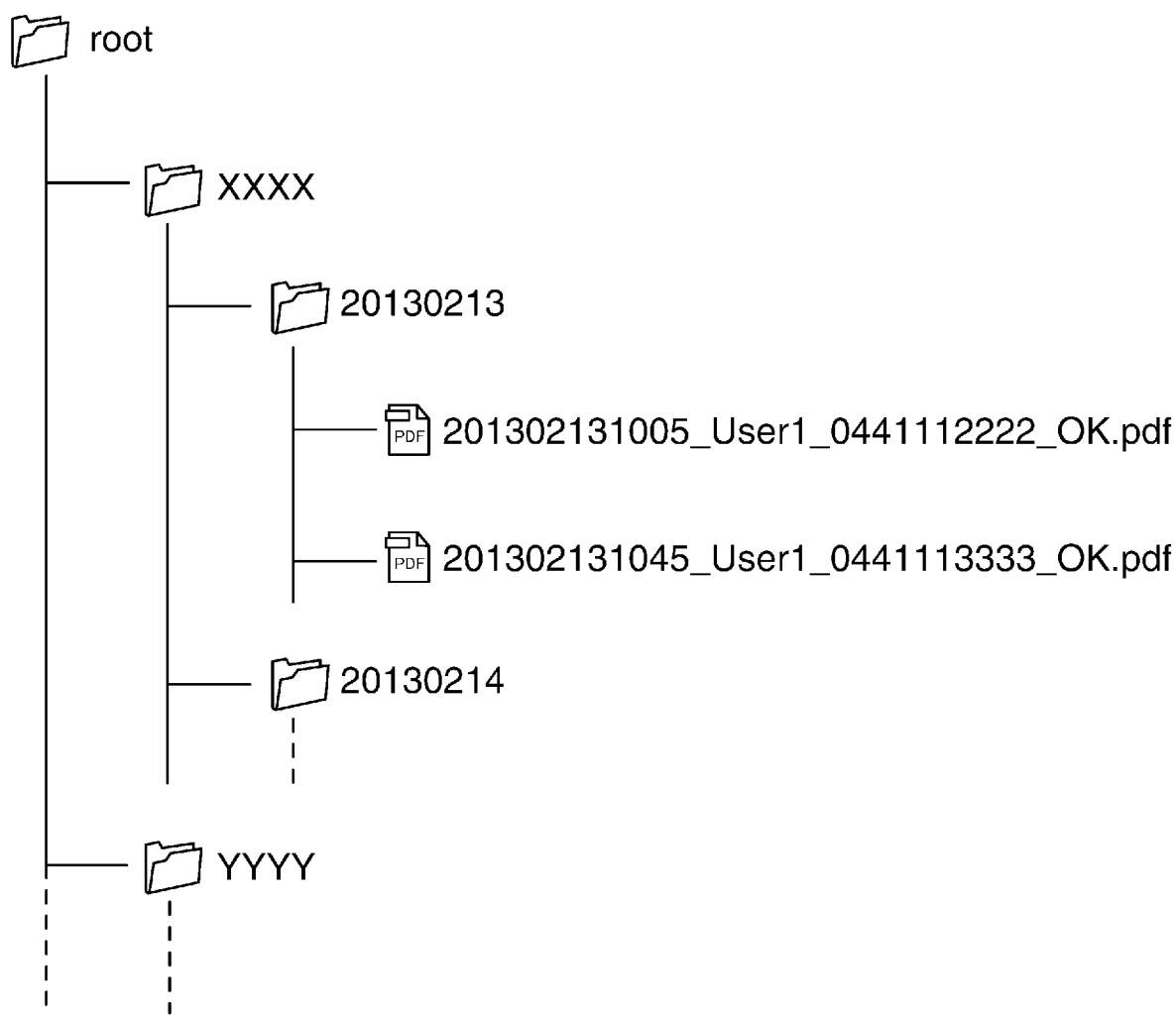
FIG. 16 is a diagram used for describing names of folders generated based on the billing code information set by the system control unit in FIG. 2.

If the transmission record at the facsimile transmission does not include the billing code as a result of the determination in step S1501, the system control unit 208 uses "none" as the billing code information, indicating that there is no billing code (step S1503). As a result, when the billing code information is set in the setting menu 601 of the first level for example, folders with names corresponding to the set billing code information are generated in the first level that is a level below "root" as shown in FIG. 16. The system control unit 208 then ends the present process after executing the process in step S1503.

The same advantage as the process in FIG. 3 can also be attained in the process in FIG. 15.

Figure 17:
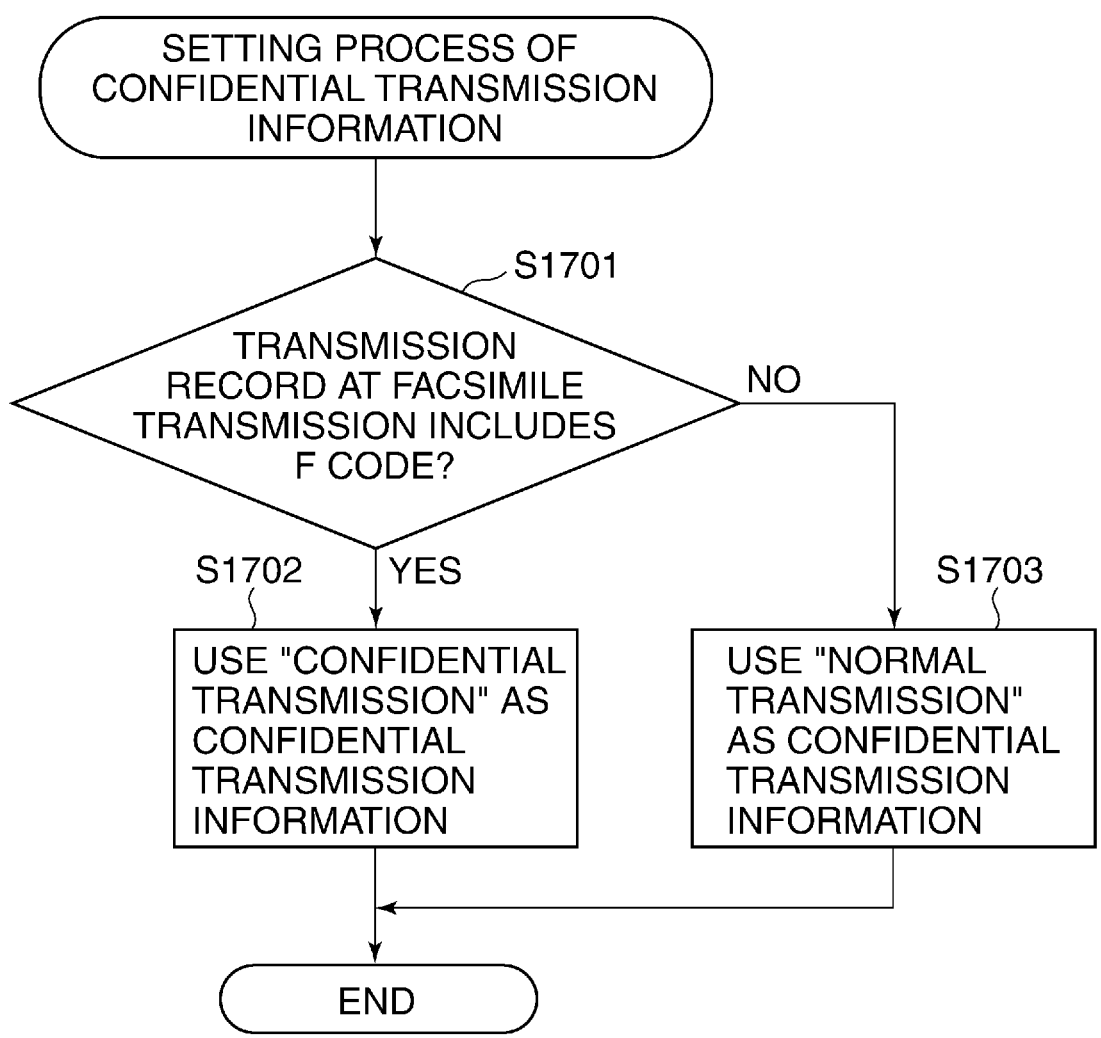
FIG. 17 is a flow chart showing a procedure of a setting process of confidential transmission information in the data communication process in FIG. 3.

In the present embodiment, confidential transmission information may be set based on an F code used for confidential transmission as shown in FIG. 17.

FIG. 17 is a flow chart showing a procedure of the setting process of the confidential transmission information executed by the image communication apparatus 103 in FIG. 2.

The system control unit 208 executes the process in FIG. 17 after the end of the facsimile transmission by the image communication apparatus 103.

In FIG. 17, the system control unit 208 first determines whether the transmission record at the facsimile transmission stored in the HDD 211 includes an F code (step S1701). The F code is a SUB signal compliant with ITU-T recommendation T.30. In the confidential transmission from the image communication apparatus 103 to the facsimile apparatus 105, the data transmitted from the image communication apparatus 103 is usually output to the facsimile apparatus 105 only if the F code included in the data transmitted from the image communication apparatus 103 coincides with an F code that is set in the facsimile apparatus 105. When the confidential transmission is performed in the present embodiment, the transmission record at the facsimile transmission stored in the HDD 211 includes the F code used in the confidential transmission.

If the transmission record at the facsimile transmission includes an F code, such as "1111" and "2222", as a result of the determination in step S1701, the system control unit 208 uses "confidential transmission" as the confidential transmission information, indicating that the transmission record at the facsimile transmission is a transmission record corresponding to the confidential transmission (step S1702) and ends the present process.

If the transmission record at the facsimile transmission does not include the F code as a result of the determination in step S1701, the system control unit 208 uses "normal transmission" as the confidential transmission information, indicating that the transmission record at the facsimile transmission is a transmission record not corresponding to the confidential transmission (step S1703).

Figure 18:
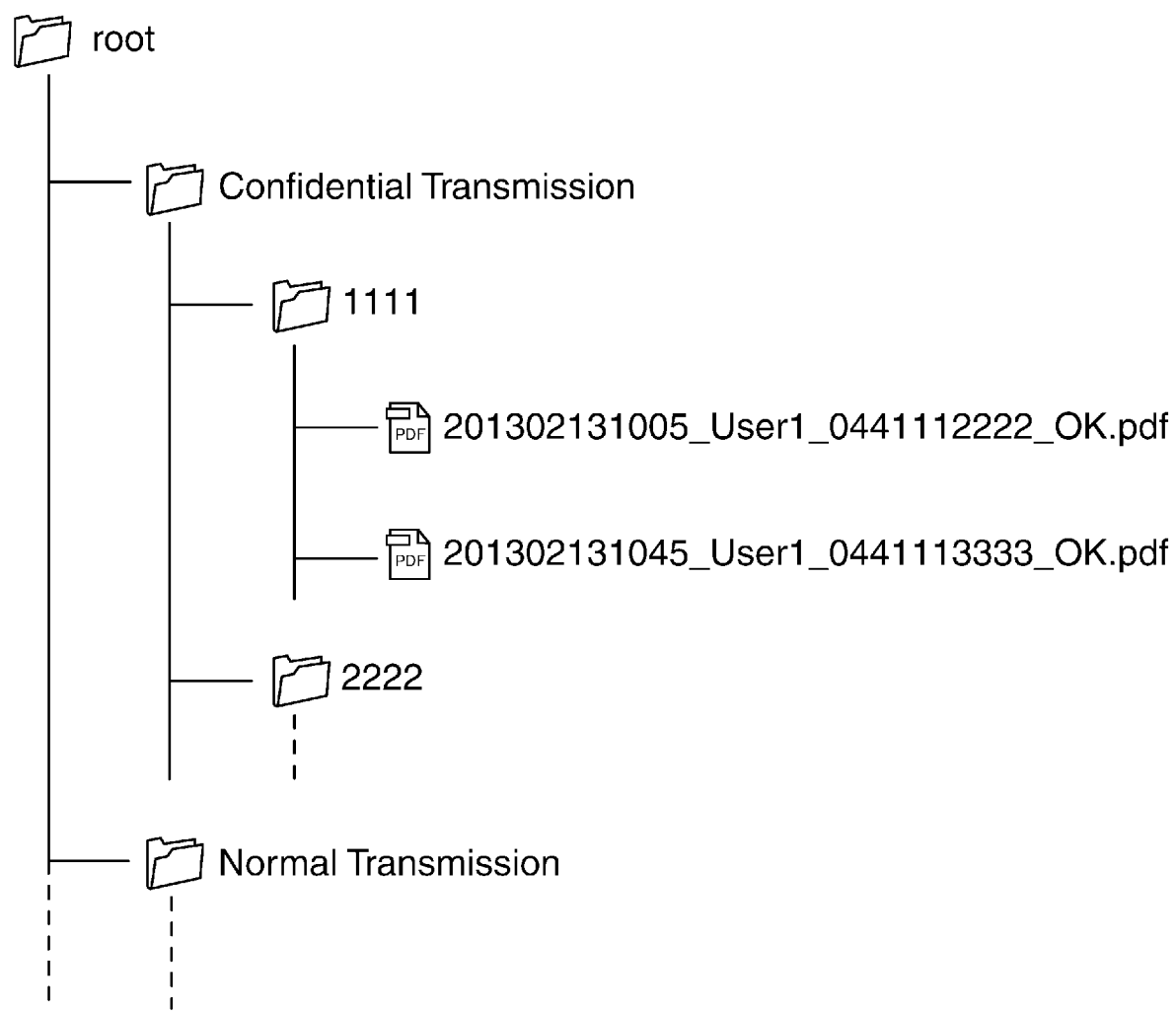
FIG. 18 is a diagram used for describing names of folders generated based on the confidential transmission information and F code information set by the system control unit in FIG. 2.

As a result, when the confidential transmission information is set in the setting menu 601 of the first level for example, folders with names corresponding to the set confidential transmission information are generated in the first level that is a level below "root" as shown in FIG. 18. The system control unit 208 then ends the present process after executing the process in step S1703.

The same advantage as the process in FIG. 3 can also be attained in the process in FIG. 17.

Figure 19:
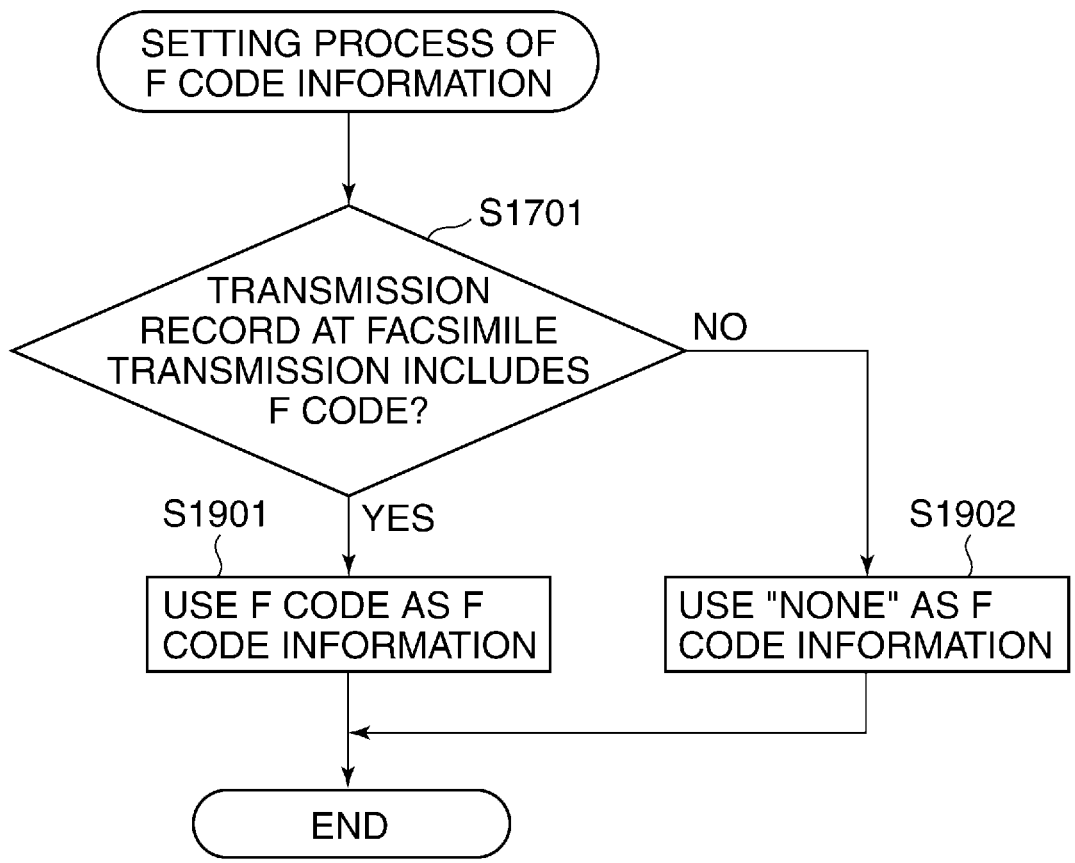
FIG. 19 is a flow chart showing a procedure of a setting process of the F code information in the data communication process in FIG. 3.

In the present embodiment, F code information may also be set based on an F code included in the transmission record at the facsimile transmission as shown in FIG. 19.

FIG. 19 is a flow chart showing a procedure of the setting process of the F code information executed by the image communication apparatus 103 in FIG. 2.

The system control unit 208 executes the process in FIG. 19 after the end of the facsimile transmission by the image communication apparatus 103.

In FIG. 19, the system control unit 208 first executes the same process as in step S1701 in FIG. 17.

If the transmission record at the facsimile transmission includes an F code, such as "1111" and "2222", as a result of the determination in step S1701, the system control unit 208 acquires the F code to use the acquired F code as the F code information (step S1901) and ends the present process.

If the transmission record at the facsimile transmission does not include the F code as a result of the determination in step S1701, the system control unit 208 uses "none" as the F code information, indicating that there is no F code (step S1902). As a result, when the F code information is set in the setting menu 602 of the second level for example, folders with names corresponding to the set F code information are generated in the second level that is a level below the first level as shown in FIG. 18. The system control unit 208 then ends the present process after executing the process in step S1902.

The same advantage as in the process in FIG. 3 can also be attained in the process in FIG. 19.

The file name of the backup data may be determined based on various information set in the processes in FIGS. 10, 12, 13, 15, 17, and 19.

If the transmission record at the facsimile transmission includes an F code and an F code password corresponding to the F code in step S1901 in FIG. 19, the F code password may also be acquired in addition to the F code, and the image communication apparatus 103 may provide the backup data with a password for opening the backup data based on the F code password.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-135852, filed Jul. 1, 2014 and No. 2015-057735, filed Mar. 20, 2015, which are hereby incorporated by reference wherein in their entirety.

What is claimed is:

1. A method of storing a file in a folder, the method comprising:
reading a document and generating image data;
executing a facsimile transmission, with a facsimile apparatus, for transmitting the generated image data to a destination;
storing, without a date and a time input by a user, a transmission log including a date and a time indicating when the facsimile apparatus executed the facsimile transmission;
generating, based on the image data, a file with a file name set based on the time, indicating when the facsimile apparatus executed the facsimile transmission of the generated image data, included in the transmission log, which is stored without the date and the time input by the user;
storing, in a case where a first folder with a first folder name set based on the date, indicating when the facimile apparatus executed the facsimile transmission of the generated image data, included in the transmission log, which is stored without the date and the time input by the user, already exists in a predetermined folder, the generated file into the first folder as another log; and
generating, in a case where the first folder does not exist in the predetermined folder, the first folder in the predetermined folder as the another log, and storing the generated file into the generated first folder as the another log.

2. The method according to claim 1, further comprising:
displaying a selection screen for allowing the user to select information to be used for the first folder name from among a plurality of types of information, including the date, regarding the facsimile transmission,
wherein the information to be used for the first folder name is set from among the plurality of types of information according to selection by the user via the selection screen.

3. The method according to claim 2, wherein the plurality of types of information include sender information.

4. The method according to claim 2, further comprising:
obtaining, in a case where a type of information is selected from among the plurality of types of information, another plurality of types of information, including a first type of information and a second type of information, associated with the selected type of information;

storing, in a case where the first type of information is obtained, the generated file into a second folder with a second folder name set based on the first type of information;

storing, in a case where the second type of information is obtained without obtaining the first type of information, the generated file into a third folder with a third folder name set based on the second type of information.

5. The method according to claim 2, wherein the plurality of types of information include recipient information.

6. The method according to claim 2, wherein the plurality of types of information include a time.

7. The method according to claim 1, wherein the file name is set based on at least one type of information including a recipient of the image data, the time when the facsimile apparatus transmits the image data to the destination, and a transmission result of the image data.

8. The method according to claim 1, wherein the destination to which the image data is transmitted by the facsimile transmission does not include an information processing apparatus.

9. The method according to claim 8, wherein the information processing apparatus, which is connectable to the facsimile apparatus via a network, is designable as a storing destination of the generated file.

10. A system comprising:
an information processing apparatus; and
a facsimile apparatus including at least one first processor that executes a first set of instructions to cause the facsimile apparatus to:
read a document and generate image data;
execute a facsimile transmission with the facsimile apparatus, and transmit the generated image data to a destination;
store, without a date and a time input by a user, a transmission log of the facsimile apparatus including a date and a time indicating when the facsimile apparatus executed the facsimile transmission; and
generate a file, based on the image data, with a file name set based on the time, indicating when the facimile apparatus executed the facsimile transmission of the generated image data, included in the transmission log, which is stored without the date and the time input by the user, and wherein the information processing apparatus includes at least one second processor that executes a second set of instructions to cause information processing apparatus to:
store, in a case where a first folder with a first folder name set based on the date, indicating when the facsimile apparatus executed the facsimile transmission of the generated image data, included in the transmission log, which is stored without the date and the time input by the user, already exists in a predetermined folder, the generated file into the first folder as another log; and
generate, in a case where the first folder does not exist in the predetermined folder, the first folder in the predetermined folder as the another log, and store the generated file into the generated first folder as the another log.

11. The apparatus according to claim 10, wherein the destination to which the image data is transmitted by the facsimile transmission does not include the information processing apparatus.

* * * * *